United States Patent
McGrath (10) Patent No.: US 12,467,569 B1
(45) Date of Patent: Nov. 11, 2025

(54) AUTOMATIC LOCKING QUICK RELEASE MECHANISMS

(71) Applicant: TripleEight LLC, Diamond Bar, CA (US)

(72) Inventor: Brendan McGrath, Diamond Barc, CA (US)

(73) Assignee: TripleEight LLC, Diamond Bar, CA (US)

( * ) Notice: Subject to any disclaimer, the term of this patent is extended or adjusted under 35 U.S.C. 154(b) by 0 days.

(21) Appl. No.: 18/658,844

(22) Filed: May 8, 2024

(51) Int. Cl.
F16L 37/23 (2006.01)

(52) U.S. Cl.
CPC .......... *F16L 37/23* (2013.01); *F16L 2201/10* (2013.01)

(58) Field of Classification Search
CPC ................................ F16L 37/22; F16L 37/23
USPC .................................................. 285/316, 317
See application file for complete search history.

(56) References Cited

U.S. PATENT DOCUMENTS

| | | | |
|---|---|---|---|
| 3,873,062 A | 3/1975 | Johnson | |
| 4,008,937 A | 2/1977 | Filippi | |
| 4,118,006 A * | 10/1978 | Norton | F16L 37/42 251/149.6 |
| 4,249,786 A | 2/1981 | Mahoff | |
| 4,881,760 A | 11/1989 | Runkles | |
| 4,900,070 A | 2/1990 | Runkles | |
| 5,188,400 A | 2/1993 | Riley | |
| 5,511,830 A | 4/1996 | Olson | |
| 5,620,210 A | 4/1997 | Eyster | |
| 6,749,231 B2 | 6/2004 | LeMay | |
| 6,971,682 B2 | 12/2005 | Hoang | |
| 7,618,070 B2 | 11/2009 | Stoll | |
| 10,221,976 B2 | 3/2019 | Kujawski | |
| 10,995,890 B2 | 5/2021 | Hafele | |
| 11,162,629 B2 | 11/2021 | Nick | |
| 2011/0148098 A1 | 6/2011 | Flynn | |
| 2016/0238173 A1 | 8/2016 | Kujawski | |
| 2017/0205010 A1 | 7/2017 | Pai | |
| 2020/0132233 A1* | 4/2020 | Taguchi | F16L 37/23 |

FOREIGN PATENT DOCUMENTS

CN 213270588 U 5/2021

* cited by examiner

*Primary Examiner* — Aaron M Dunwoody
(74) *Attorney, Agent, or Firm* — Lynch LLP (57) ABSTRACT

A quick release locking connector system for fluid or mechanical systems. Systems of the inventive subject matter comprise a female connector with an assembly body, a release collar, a release collar spring, ball bearings, a locking collar, and a locking spring. The system also includes a male connector with an insertion end, a locking flare, and a visual locking indicator. The locking flare interacts with the locking collar upon insertion of the male connector into the female connector. The visual locking indicator is covered by the female connector upon insertion. The system provides a secure and reliable connection, reducing the risk of leaks and facilitating easy connection and disconnection of components.

14 Claims, 5 Drawing Sheets

AUTOMATIC LOCKING QUICK RELEASE MECHANISMS

FIELD OF THE INVENTION

The field of the invention is fluid and mechanical quick release mechanisms.

BACKGROUND

The background description includes information that may be useful in understanding the present invention. It is not an admission that any of the information provided in this application is prior art or relevant to the presently claimed invention, or that any publication specifically or implicitly referenced is prior art.

Quick release connectors are useful in fluid and mechanical systems because they allow for fast and easy connection and disconnection of components. This can save time and effort when setting up, maintaining, or modifying a fluid or mechanical system. Quick release connectors also provide a secure and reliable connection, reducing risks of leaks resulting from install errors and vibration loosening to ensure the system operates effectively. Additionally, quick release connectors can help to minimize wear and tear on components, extending the lifespan of the system.

Many different quick release solutions already exist. For example, in U.S. Patent Application No. 2017/0205010 describes quick connectors that include color coding to ensure male and female quick connectors are easy to pair together. U.S. Pat. No. 10,221,976, on the other hand, is directed to a quick release system that can be used to create a fluidic seal between different tubular components. These two references are among many that exist in this space, but the state of the art leaves a few areas for improvement.

For example, in many quick release connectors, O-rings that are included to create fluidic seals are disposed on male connectors, which can expose them to damage from external factors such as impacts, UV light, and so on. Moreover, while visual indicators have been contemplated to facilitate matching like male and female components, visual indicators can also be used to indicate that a proper fluid connection has been established, which can reduce incidents of improper connections. Additionally, many quick release connectors—as well as clamp-style connectors—require two hands to use, at least in part because there are multiple components that must be manipulated simultaneously (clamp-style) or the locking/unlocking mechanism is spring loaded, which makes one-handed operation difficult.

Thus, a need exists in the art for a new type of quick connector that can be operated with one hand and that makes proper connection simple and verifiable with multiple redundancies while using just one hand.

These and all other extrinsic materials discussed in this application are incorporated by reference in their entirety. Where a definition or use of a term in an incorporated reference is inconsistent or contrary to the definition of that term provided in this application, the definition of that term provided in this application applies and the definition of that term in the reference does not apply.

Thus, it has yet to be appreciated that quick release connectors for fluid or mechanical systems can be improved upon by incorporating quality of life features that reduce the incidence of failed connections as well as improve user experience and ease of operation.

SUMMARY OF THE INVENTION

The present invention provides systems and methods directed to quick connectors for a variety of mechanical applications. In one aspect of the inventive subject matter, a quick release locking connector comprises: an assembly body; a release collar disposed around the assembly body; a spring between the assembly body and the release collar; a plurality of ball bearings disposed in a plurality of through holes, wherein each through hole passes through the assembly body; a locking collar disposed within the assembly body; and a locking spring disposed between the assembly body and the locking collar.

In some embodiments, the spring and the locking spring motivate the release collar and the locking collar, respectively, in the same direction. The locking collar can include a notch on a side of the locking collar facing the assembly body. The release collar can have a locking protrusion on an interior side facing the assembly body. In some embodiments, the assembly body has a backstop protrusion. In some embodiments, the assembly body includes a locking channel. In some embodiments, the release collar has a slot and the assembly body has a protrusion that is configured to fit in the slot when the release collar is moved to bring the female connector into an unlocked configuration.

In another aspect of the inventive subject matter, a quick release locking connector system comprises a female connector and a male connector. The female connector comprises: an assembly body; a release collar disposed around the assembly body; a spring between the assembly body and the release collar; a plurality of ball bearings disposed in a plurality of through holes, wherein each through hole passes through the assembly body; a locking collar disposed within the assembly body; and a locking spring disposed between the assembly body and the locking collar.

The male connector comprises: an insertion end; a locking flare disposed on the insertion end and configured to interact with the locking collar upon inserting the male connector into the female connector; and a visual locking indicator disposed on the insertion end that is configured to be covered by the female connector upon inserting the male connector into the female connector.

In some embodiments, the spring and the locking spring motivate the release collar and the locking collar, respectively, in the same direction. The locking collar can have a notch on a side of the locking collar facing the assembly body. The release collar can have a locking protrusion on an interior side facing the assembly body. In some embodiments, the assembly body has a backstop protrusion. The female connector can also include a locking channel. The release collar can have a slot and the assembly body comprises a protrusion that is configured to fit within the slot upon sliding the release collar to bring the female connector into an unlocked configuration.

One should appreciate that the disclosed subject matter provides many advantageous technical effects including quick locking and quick releasing connector systems that reduce incidents of connection failures while facilitating one-handed use.

Various objects, features, aspects and advantages of the inventive subject matter will become more apparent from the following detailed description of preferred embodiments, along with the accompanying drawing figures in which like numerals represent like components.

DETAILED DESCRIPTION

The following discussion provides example embodiments of the inventive subject matter. Although each embodiment represents a single combination of inventive elements, the inventive subject matter is considered to include all possible combinations of the disclosed elements. Thus, if one embodiment comprises elements A, B, and C, and a second embodiment comprises elements B and D, then the inventive subject matter is also considered to include other remaining combinations of A, B, C, or D, even if not explicitly disclosed.

As used in the description in this application and throughout the claims that follow, the meaning of "a," "an," and "the" includes plural reference unless the context clearly dictates otherwise. Also, as used in the description in this application, the meaning of "in" includes "in" and "on" unless the context clearly dictates otherwise.

Also, as used in this application, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

Embodiments of the inventive subject matter are directed to quick connect/release devices that can be used with, e.g., pneumatic tubing, mechanical systems, and the like. For example, pneumatic systems can benefit from effective and easy to use quick release connectors to make it easier to swap components. In other contexts, systems of the inventive subject matter can be used with purely mechanical systems to attach or detach different components. For example, a car can include a female connector of the inventive subject matter on its shifting stem, where the shifting knob features a male connector on its bottom portion. By featuring a female quick connector on the shifting stem, different knobs can easily be swapped in and out.

Figure 1:
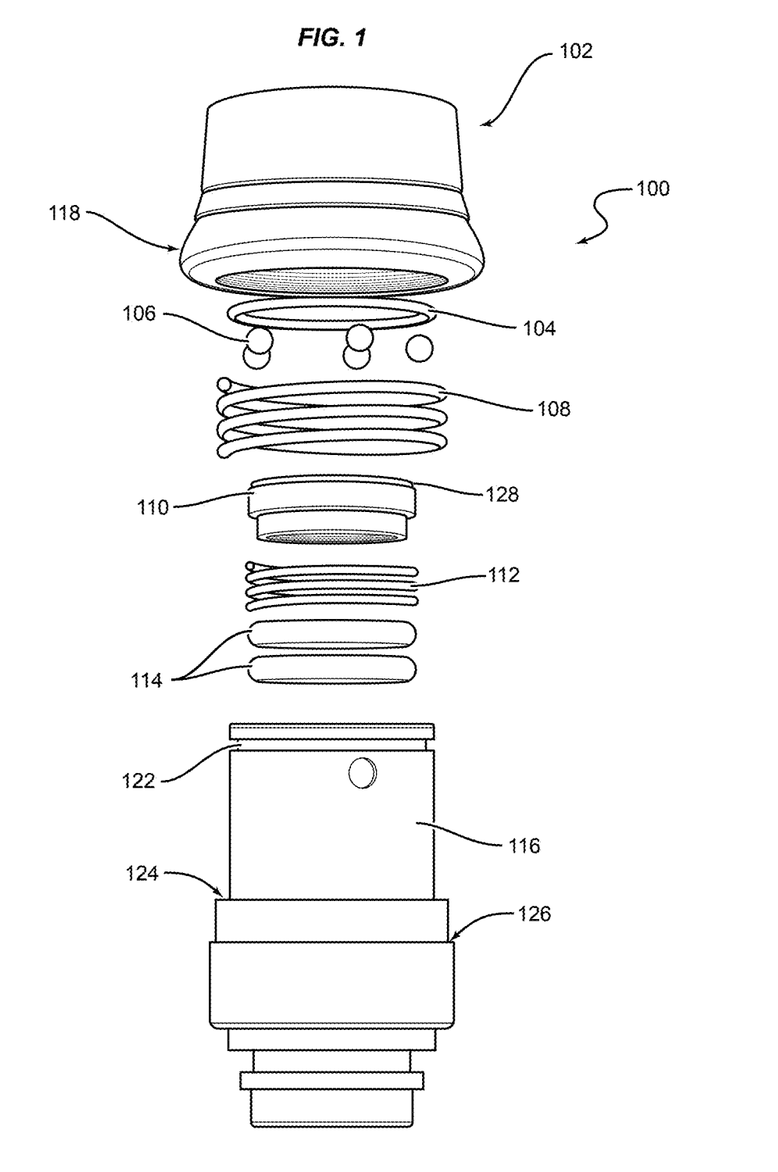
FIG. 1 is an exploded view of a female quick connector.

FIG. 1 shows an exploded view of a female quick connector of the inventive subject matter. Female quick connector 100 comprises a release collar 102, a retaining clip 104, ball bearings 106, a release collar spring 108, a locking collar 110, a locking spring 112, O-rings 114, and an assembly body 116. These parts together form female quick connector 100 that is configured to receive male quick connectors of the inventive subject matter.

Figure 2:
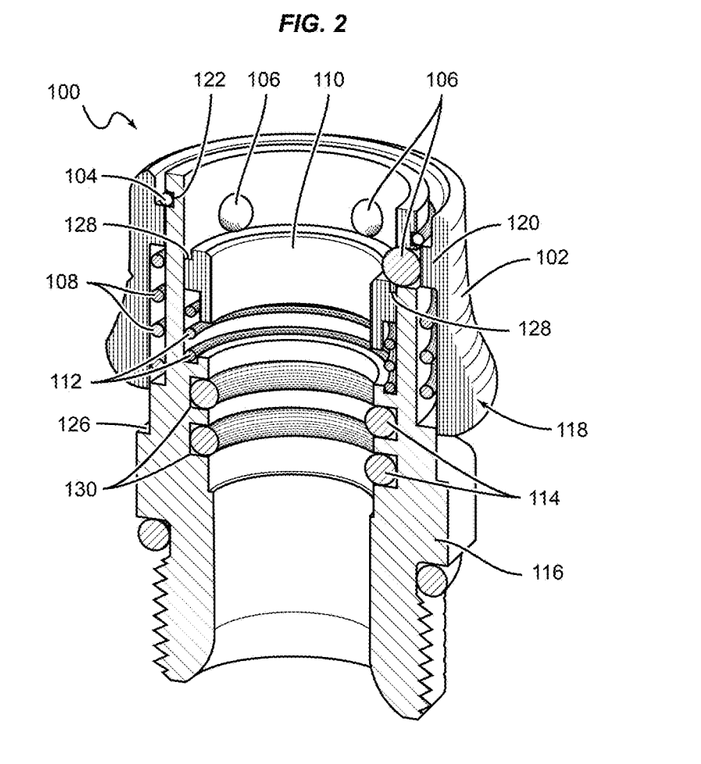
FIG. 2 is a cutaway view of the female quick connector.

FIG. 2 shows a cutaway view of assembled female quick connector 100. This view shows how ball bearings 106 interact with release collar 102 and locking collar 110. For example, this view shows female quick connector at rest with the release collar 102 in an unretracted position such that it hold ball bearings 106 toward an interior portion of female locking connector 100. Each ball bearing is disposed in a through hole that connects the interior side of assembly body 302 with the exterior side of assembly body 302. These through holes should have diameters that are larger than diameters of ball bearings 106, but close enough in size that ball bearings 106 do not justle or experience unwanted movements during operation.

Release collar 102 comprises a flared base 118 that flares outward to make it easier for a user to grip the component when pulling it into a retracted position, and it also includes a locking protrusion 120. Locking protrusion 120 has an inner diameter that is smaller than an inner diameter of the rest of release collar 102. From locking protrusion 120 and downward toward the end of flared base 118, release collar 102 has a constant interior radius, where the difference between the interior radius of the release collar and the interior radius of the locking protrusion 120 is enough to accommodate release collar spring 108. Thus, locking protrusion 120 is disposed circumferentially around an interior side of release collar. Locking protrusion 120 is designed to interact with ball bearings 106 while also creating a surface that release collar spring 108 can press against.

In FIG. 2, locking protrusion 120 is shown holding ball bearings 106 inward toward the middle portion of female quick connector 100. Release collar 102 is pressed upward by release collar spring 108, and it is prevented from disconnecting entirely from female quick connector 100 by retaining clip 104. When collar spring 108 presses release collar 102 upward, locking protrusion 120 runs into retaining clip 104, which prevents release collar 102 from moving any further. Retaining clip 104 is a ring-shaped component that fits into retaining clip groove 122. Retaining clip 104 can be made from, e.g., metal or plastic, and it can include a cutout that allows it to bend so that it can be placed into retaining clip groove 122. Once release collar 102 is in the position shown in FIG. 2, locking protrusion 120 also presses ball bearings 106 inward.

FIG. 2 also shows O-rings 114, which are internally disposed. O-rings help to create a gas or fluid-tight seal between female quick connector 100 and the male quick connector that is coupled to it. O-rings 114 are located in a portion of female quick connector 100 that has an internal diameter that is sized and dimensioned to be compatible with a complementary male quick connector, such that O-rings 114 can press against an exterior surface of the male component. These features are shown in more detail in FIG. 3-5.

Female quick connector 100 has three different configurations: uncoupled; prepared-for-coupling; and coupled. FIG. 2 shows female quick connector 100 in an uncoupled configuration. In general, the uncoupled configuration is the least likely configuration for female quick connector 100 to be in: in this configuration, release collar 102 is pressed up so that ball bearings 106 are pressed inward. This would normally only occur when a male quick connector has been fully inserted into female quick connector 100, thereby pressing locking collar 110 down to allow ball bearings 106 to move inward, which in turn allows release collar 102 to move upward due to force applied by release collar spring 108. This configuration can be reached by, e.g., manually pressing locking collar 110 downward to compress locking spring 112 without also inserting a male quick connector.

Figure 3:
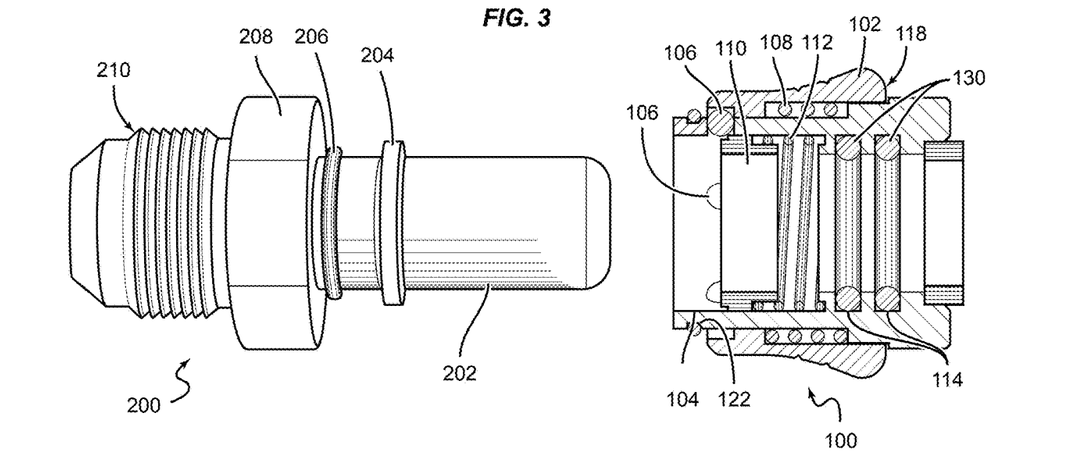
FIG. 3 is a cutaway view of the female quick connector in a prepared-for-coupling configuration with a male component above it.
Figure 4:
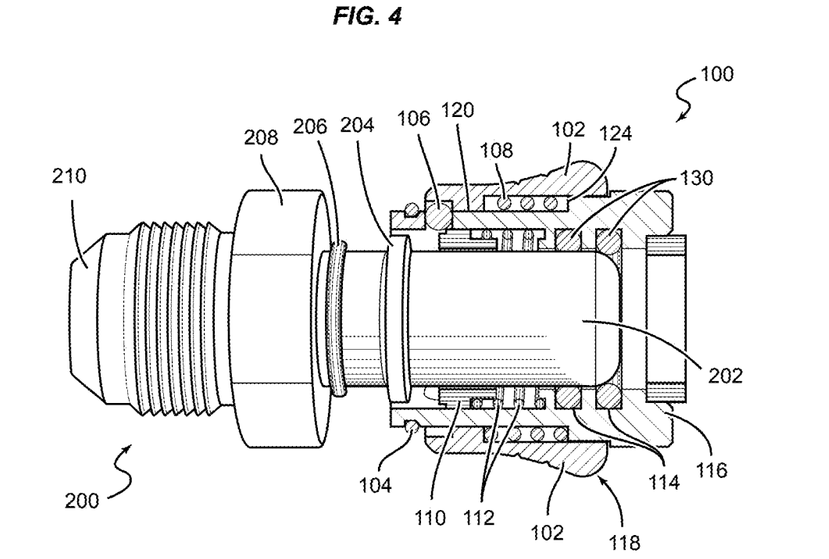
FIG. 4 is a cutaway view of the female quick connector with the male component partially inserted.
Figure 5:
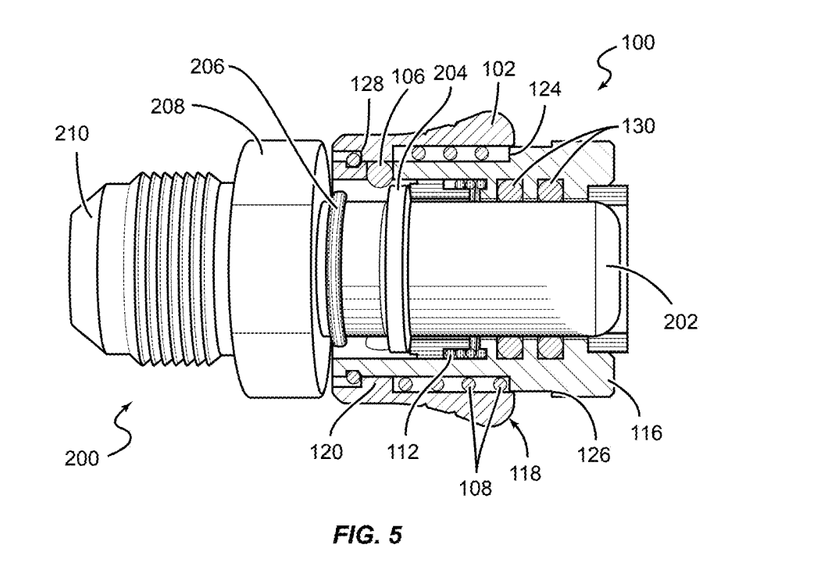
FIG. 5 is a cutaway view of the female quick connector in a coupled configuration with the male component fully inserted.

FIGS. 3-5 show female quick connector 100 with a male quick connector 200 arranged in sequence from uncoupled to coupled. In FIG. 3, female quick connector 100 is in a prepared-for-coupling configuration. To get female quick connector 100 into a prepared-for-coupling configuration, a user must pull down on release collar 102. As mentioned above, flared base 118 makes it easier to do this without slipping or losing grip, which in turn makes it easier to operate with one hand.

When release collar 102 is pulled downward, release collar spring 108 is compressed between locking protrusion 120 and spring protrusion 124 of assembly body 116. Spring protrusion 124 exists so that collar spring 108 has a surface to press against when it is compressed through normal use. Past spring protrusion 124 is backstop protrusion 126. Backstop protrusion 126 acts as a stopping point for release collar 102. When release collar 102 is pulled downward, it eventually hits backstop protrusion 126. Backstop protrusion 126 is therefore positioned far enough down assembly body 116 to allow release collar 102 to move enough to allow ball bearings 106 to be pressed outward by locking collar 110.

Thus, when release collar 102 is pulled downward (as indicated by an arrow next to it in FIG. 3), locking spring 112 presses locking collar 110 upward. When locking collar 110 is pressed upward, it presses ball bearing 106 outward. When ball bearings 106 are pressed outward, they prevent release collar 102 from moving upward again. Locking collar 110 features a notch 128 along its top edge. Notch 128 facilitates moving ball bearings 106 outward when locking collar 110 moves upward while preventing locking collar 110 from being ejected entirely from female quick connector 100. Because at least a portion of each ball bearing 106 still extends into the interior space of female quick connector 100, prevented from fully pressing outward by release collar 102, locking collar 110 is held in by ball bearings 106. Notch 128 is designed to allow locking collar 110 to move ball bearings by contacting them on different parts of their surfaces than locking collar 110 would contact them without notch 128. In other words, without notch 128, a force vector on a ball bearing resulting from interaction with locking collar 110 would be almost entirely vertical (e.g., aligned with the upward movement of locking collar 110), but with notch 128, a force vector acting on a ball bearing is angled more radially outward. In some embodiments, notch 128 can be configured as an angled surface or a curved surface, which can create the same effect.

Locking collar 110 therefore has an outer diameter that is smaller than an inner diameter of assembly body 116 that it is disposed in, but it should be similarly sized and dimensioned so that it can move within assembly body 116 in a piston-like manner without much play between the two components.

Male quick connector 200, shown above female quick connector 100, is shown in position to be inserted into female quick connector 100. As discussed above, female quick connector 100 is in a prepared-for-coupling configuration so that when male quick connector 200 is inserted into female quick connector 100, female quick connector 200 can lock upon full insertion. Male quick connector 100 has fewer components than female quick connector 200. Male quick connector thus features an insertion end 202, a locking flare 204, a visual locking indicator 206, and a flared base 208. Male quick connector 200 is shown having a standardized coupling 210 on top, and this should be understood as being representative of any number of coupling components that can be included depending on a particular need.

FIG. 4 shows male quick connector 200 partially inserted into female quick connector 100. Thus, insertion end 202 is partially inserted into female quick connector 100 such that only one O-ring 114 is interacting with both female quick connector 100 and male quick connector 200. Insertion end 202 features a tapered end (e.g., rounded, chamfered, or the like) to make it easier for insertion end 202 to couple with O-rings 114. Because O-rings 114 are designed to create a seal between male quick connector 200 and female quick connector 100, O-rings 114 have a slightly smaller inner diameter than the outer diameter of insertion end 202, which ensures a tight seal between insertion end 202 and assembly body 116 that O-rings 114 are disposed within. O-rings 114 are held in place by O-ring grooves 130.

O-rings 114 of the inventive subject matter are disposed on an internal surface of female quick connector 100 instead of on an external surface of male quick connector 200. This configuration allows for easy inspection of the coupling surface (e.g., the external surface of male quick connector 200 that interacts with O-rings 114 upon full insertion into female quick connector 100).

As male quick connector 200 continues down from its position in FIG. 4 to its position in FIG. 5, locking flare 204 moves into assembly body 116 and eventually interacts with locking collar 110. Once locking flare 204 hits locking collar 110 and is further pressed down, locking collar 110 moves downward and out of way of ball bearings 106. Once locking collar 110 is pressed down and out of the way of ball bearings 106, release collar 102 is pressed upward by release collar spring 108, thereby applying pressure to ball bearings 106. This pressure is continuously applied until male quick connector 200 is pressed down into female quick connector 100 far enough that it is in a locked position, as shown in FIG. 6.

In FIG. 6, male quick connector 200 is fully inserted into female quick connector 100, and female quick connector 200 is in a locked configuration. Once male quick connector 200 is fully inserted into female connector 200, locking flare 204 passes ball bearings 106 and release collar 102 can be fully moved upward by release collar spring 108. By pressing release collar 102 all the way to its locked position (e.g., pushing male quick connector 200 into female quick connector 100 until flared base 208 abuts a top surface of female quick connector 200), an interior wall of release collar 102 presses ball bearings 106 inward so that ball bearings 106 move inward toward male quick connector above (as drawn) locking flare 204. This locking action creates an audible clicking sound that gives a user an auditory confirmation that the mechanism is locked and a seal exists between male quick connector 200 and female quick connector 100. In addition to auditory confirmation, a visual locking indicator 206 is included on male quick connector 200. Visual locking indicator 206 is a component that can be brightly colored and is positioned on male quick connector 200 near flared base 208. By placing it up against flared base 208, visual locking indicator is hidden only when male quick connector 200 is fully inserted into female quick connector 100, with female quick connector 100 in a locked configuration.

Figure 6A:
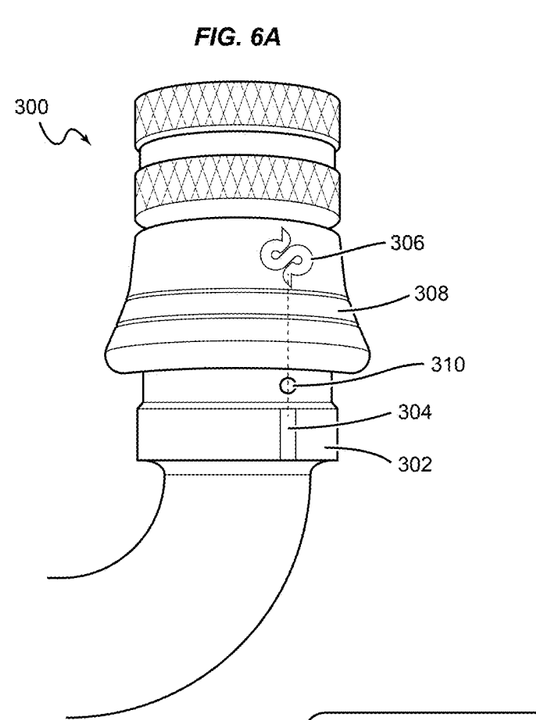
FIG. 6A shows a female quick connector having a visually identifiable locking feature.
Figure 6B:
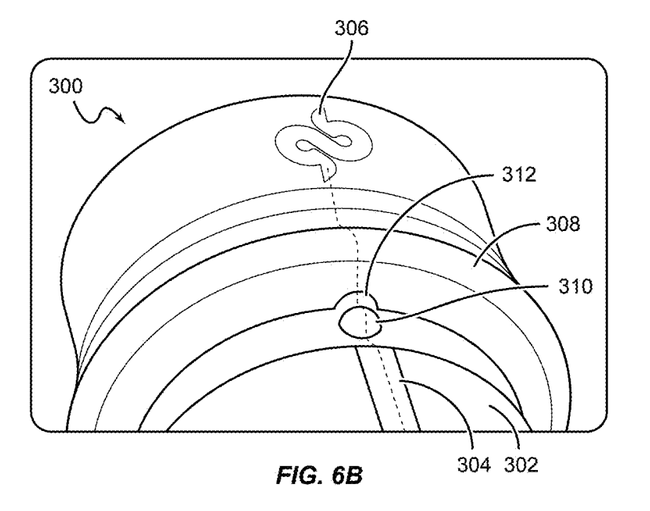
FIG. 6B shows the female quick connector from FIG. 6A from a bottom, angled view.

FIGS. 6A and 6B show an embodiment of a female quick connector 300 that includes a feature to prevent accidental unlocking. FIGS. 6A and 6B show female quick connector 300 in a locked configuration (meaning the release collar is pushed upward). Assembly body 302 features a marking 304, a protrusion 310 (e.g., a surface feature that extends beyond a surrounding surface), and a second marking. When marking 304 is aligned with second marking 306 (in this case, a logo) on release collar 308, release collar 308 can be moved (e.g., translated along assembly body 302) from a locked configuration to an unlocked configuration, because slot 312 in release collar 308 is aligned with protrusion 310 (as shown in FIG. 6B). When marking 304 and second marking 306 are not aligned, slot 312 in release collar 308 is not aligned with protrusion 310 and cannot move. This results in release collar 308 being held in the locked configuration, which prevents accidental unlocking. FIG. 6B shows female quick connector 300 from an angle that shows protrusion 310 aligned with slot 312.

Figure 7A:
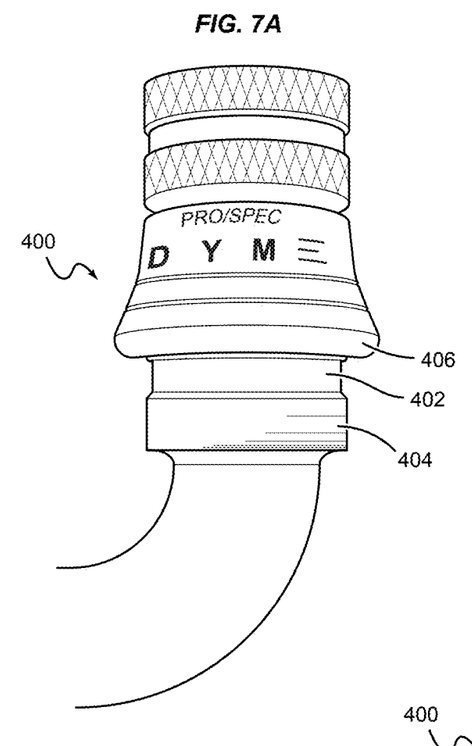
FIG. 7A shows a female quick connector having a locking channel.
Figure 7B:
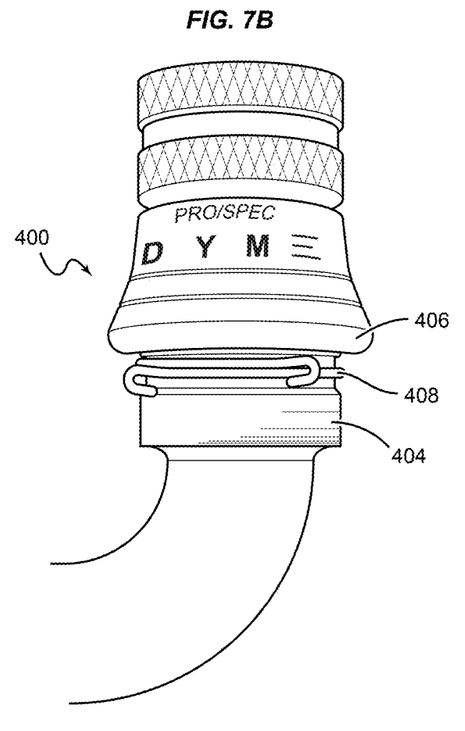
FIG. 7B shows the female quick connector from FIG. 7A with a clip disposed in the locking channel.

FIG. 7A shows an embodiment of a female quick connector 400 that features a locking channel 402. Locking channel 402 is a feature on assembly body 404 and it is located immediately below release collar 406. As shown in FIG. 7B, a locking clip 408 can be placed in locking channel 402 such that locking clip 408 can prevent release collar 406 from sliding relative to assembly body 404.

Embodiments of the inventive subject matter can be used in a wide variety of different applications. For example, quick connectors described in this application can be used with the following hose systems: crimped type hoses, Superleggera PTFE AN04-AN20 hoses, Ultra Steel PTFE AN04-AN20, Mil-Spec SL PTFE AN04-AN20, Mil-Spec US PTFE AN04-AN20, Super Strasse CPE rubber AN04-AN20, fitting fluid compatibility gasoline hoses, ethanol hoses, motor oil hoses, transmission fluid hoses, glycol cooland hoses, nitrous oxide hoses, gear oil hoses, brake fluid hoses, compression type hoses, Super Strasse CPE rubber AN04-AN20, and so forth.

Thus, specific systems and methods directed to quick release connectors have been disclosed. It should be apparent, however, to those skilled in the art that many more modifications besides those already described are possible without departing from the inventive concepts in this application. The inventive subject matter, therefore, is not to be restricted except in the spirit of the disclosure. Moreover, in interpreting the disclosure all terms should be interpreted in the broadest possible manner consistent with the context. In particular the terms "comprises" and "comprising" should be interpreted as referring to the elements, components, or steps in a non-exclusive manner, indicating that the referenced elements, components, or steps can be present, or utilized, or combined with other elements, components, or steps that are not expressly referenced.

What is claimed is:

1. A quick release locking connector, comprising:
   an assembly body comprising a backstop protrusion that is configured to interact with a release collar;
   the release collar disposed around the assembly body, the release collar comprising a rounded flared base;
   a spring between the assembly body and the release collar;
   a plurality of ball bearings disposed in a plurality of through holes, wherein each through hole passes through the assembly body;
   a locking collar disposed within the assembly body; and
   a locking spring disposed between the assembly body and the locking collar;
   the assembly body comprising a first O-ring disposed in a first O-ring groove and a second O-ring disposed in a second O-ring groove; and
   wherein the first O-ring groove and the second O-ring groove are disposed on an interior surface of the assembly body.

2. The quick release locking connector of claim 1, wherein the spring and the locking spring motivate the release collar and the locking collar, respectively, in the same direction.

3. The quick release locking connector of claim 1, wherein the locking collar comprises a notch on a side of the locking collar facing the assembly body.

4. The quick release locking connector of claim 1, wherein the release collar comprises a locking protrusion on an interior side facing the assembly body.

5. The quick release locking connector of claim 1, further comprising a locking channel.

6. The quick release locking connector of claim 1, wherein the release collar comprises a slot and the assembly body comprises a protrusion that is configured to fit within the slot upon sliding the release collar to bring the quick release locking connector into an unlocked configuration.

7. The quick release locking connector of claim 1, wherein the first O-ring groove and the second O-ring groove are disposed on the interior surface at the same radial distance from an axial center of the assembly body.

8. The quick release locking connector of claim 1, wherein the first O-ring groove and the second O-ring groove are identical.

9. A quick release locking connector system, comprising:
   a female connector comprising:
     an assembly body comprising a backstop protrusion that is configured to interact with a release collar;
     the release collar disposed around the assembly body, the release collar comprising a rounded flared base;
     a spring between the assembly body and the release collar;
     a plurality of ball bearings disposed in a plurality of through holes, wherein each through hole passes through the assembly body;
     a locking collar disposed within the assembly body; and
     a locking spring disposed between the assembly body and the locking collar;
     the assembly body comprising a first O-ring disposed in a first O-ring groove and a second O-ring disposed in a second O-ring groove; and
     wherein the first O-ring groove and the second O-ring groove are disposed on an interior surface of the assembly body
   a male connector comprising:
     a locking flare configured to interact with the locking collar and with the plurality of ball bearings upon inserting the male connector into the female connector;
     a flared base; and
     a visual locking indicator comprising a ring around the male connector and disposed against the flared base;
     wherein the visual locking indicator is configured to be completely covered by the female connector upon fully inserting the male connector into the female connector such that the locking flare is engaged with the plurality of ball bearings to lock the female connector to the male connector.

10. The quick release locking connector system of claim 9, wherein the spring and the locking spring motivate the release collar and the locking collar, respectively, in the same direction.

11. The quick release locking connector system of claim 9, wherein the locking collar comprises a notch on a side of the locking collar facing the assembly body.

12. The quick release locking connector system of claim 9, wherein the release collar comprises a locking protrusion on an interior side facing the assembly body.

13. The quick release locking connector system of claim 9, wherein the female connector further comprises a locking channel.

14. The quick release locking connector system of claim 9, wherein the release collar comprises a slot and the assembly body comprises a protrusion that is configured to fit within the slot upon sliding the release collar to bring the female connector into an unlocked configuration.

* * * * *